UNITED STATES PATENT OFFICE.

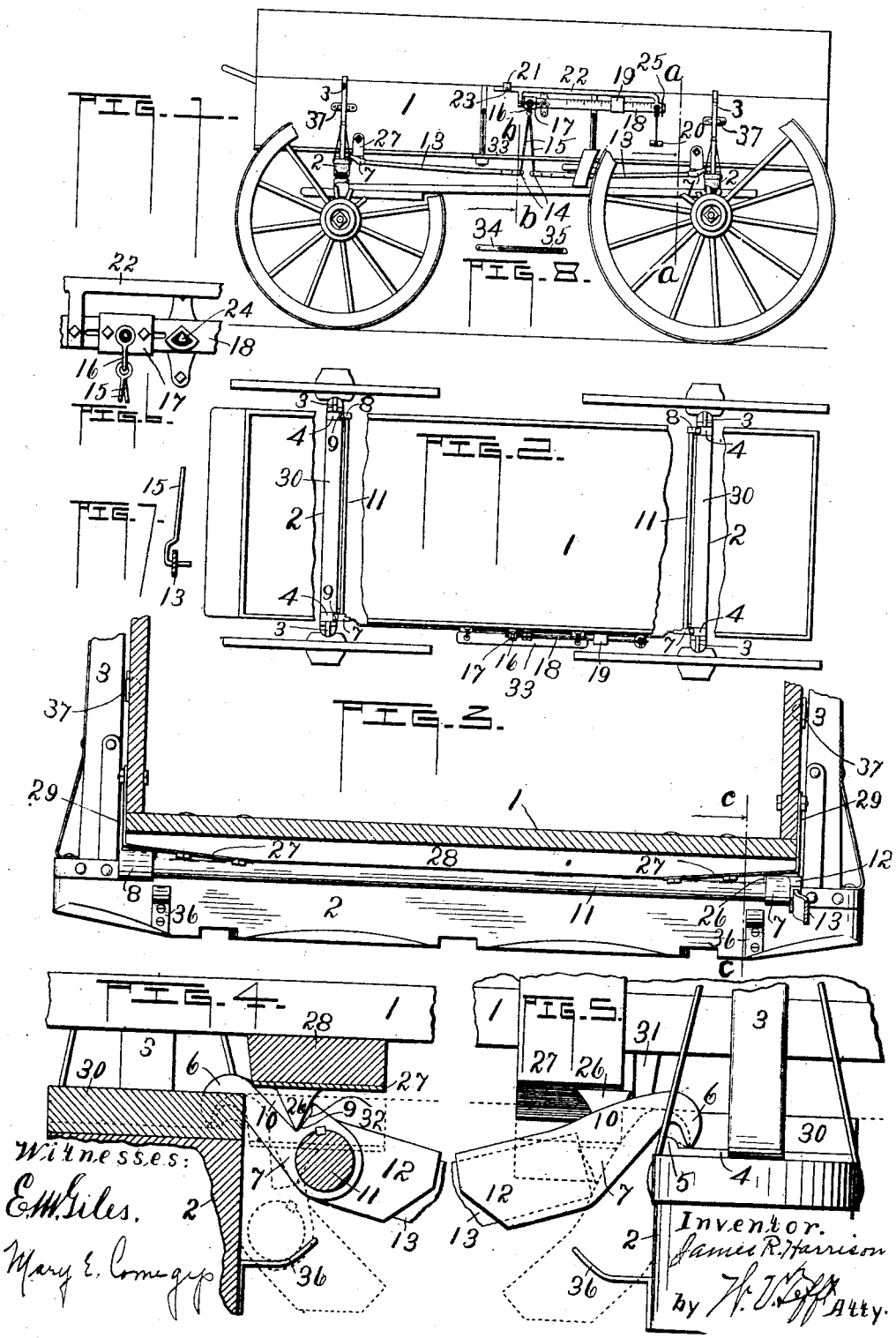

JAMES R. HARRISON, OF PEORIA, ILLINOIS.

VEHICLE-WEIGHER.

No. 864,093.   Specification of Letters Patent.   Patented Aug. 20, 1907.

Application filed December 30, 1905. Serial No. 294,014.

*To all whom it may concern:*

Be it known that I, JAMES R. HARRISON, a citizen of the United States, residing at Peoria, in the county of Peoria and State of Illinois, have invented certain new and useful Improvements in Vehicle-Weighers; and I do hereby declare that the following is a full, clear, and exact description of the invention, which will enable others skilled in the art to which it appertains to make and use the same.

This invention has reference to weighing devices, which are mounted upon vehicles and adapted to weigh the load carried by the vehicle.

The object of my invention is to provide simple and efficient means on the vehicle for weighing the load, which it carries, and further to provide such means that can be easily and readily applied to an ordinary vehicle.

Referring to the accompanying drawings, which are made a part hereof, and in which similar reference characters indicate similar parts, Figure 1 is a side view of a wagon with my weighing device applied thereto, showing the parts in their positions of operation, portions of the wagon wheels being broken away for the purpose of illustration; Fig. 2 a top view of the wagon of Fig. 1, portions of the wagon bed being broken away to show the parts of the weighing device on the bolsters; Fig. 3 a vertical cross sectional view on the line $a$—$a$ of Fig. 1, looking in the direction indicated by the arrow; Fig. 4 a vertical sectional view on the line $c$—$c$ of Fig. 3, looking in the direction indicated by the arrow; Fig. 5 a view of the parts of Fig. 1 as they appear from the outside, or from the right hand end of Fig. 3; Fig. 6 an enlarged view of the adjustable scale block of the scale beam; Fig. 7 a view somewhat enlarged, on the line $b$—$b$ of Fig. 1, looking in the direction indicated by the arrow, showing the detachable connection of the lifting levers and the scale beam; and Fig. 8 shows an extension such as I employ for lengthening the lifting levers when the bolsters are more widely separated.

In the drawings, which show the application of my invention to an ordinary wagon, 1 is the wagon bed, which is supported on the bolsters 2 and held in place thereon against lateral displacement by means of the standards 3 which are provided at each end of the bolsters. The bolsters 2 are connected and mounted on the running gear in the usual manner and are provided on their upper faces inside and adjacent the standards 3 with the plates 4 which are securely fastened to the bolsters in any suitable manner. These plates (four in number) are rather broad inasmuch as they are designed to bear the weight of the load during the operation of weighing, and each is provided on its inner transverse edge with a beading 5 over and beyond which extends the hooked portions 6 of the castings 7 and 8. These castings, which serve to raise and hold the load during the weighing thereof, are likewise rather broad so as to be of sufficient strength and the hooked portions 6 which are fulcrumed on the plates 4, are tapered to a V shaped edge as shown.

In the upper face of each of the castings 7 and 8 and suitably distanced from the bearing edge of the hooked portions 6 thereof to provide considerable leverage and to raise the wagon bed a sufficient distance above its position of rest on the bolster 2, is provided a notch 9 which extends transversely of the casting and is adapted to receive a V shaped projection from the bed of the wagon. These notches preferably do not extend entirely across the width of the castings, but a web portion 10 is provided on the outer edges thereof, as shown, to strengthen the casting. As can readily be seen in Fig. 2, there is a casting of the above description at each end of each bolster, and the said castings 7 and 8 on each bolster are connected by means of shafts 11 so that when the castings 7 are moved on their fulcrum edges, a corresponding movement is imparted to the castings 8. The castings 7 are provided with integral extending portions 12 adapted to receive the ends of the flat rods or levers 13, a short distance therein, as shown by the dotted lines in Fig. 5. These rods fit within the openings in said extending portions 12 in such a manner that they may be easily inserted and removed as they are designed to be removed when the weighing mechanism is not in use, and the extending portions 12 of the castings are of such length and beveled as shown so that when in the inoperative position (shown in dotted lines in Figs. 4 and 5) they do not extend below the lower edge of the bolster as is clearly shown in the drawings. The rods 13 are of sufficient length so that when inserted in the openings of the castings 7, and raised to the position shown in Fig. 1 in an ordinary wagon, their ends are brought close together. In the ends of these rods are provided perforations 14 which hook upon the lower ends of the links or hangers 15, which said hangers are connected at their upper ends to the loop 16 on the adjustable block 17 of the scale beam 18. This scale beam, as is customary, is provided with the graduated arm upon which rides the weight 19, the pendent weights 20 at the outer end of the scale beam and is further provided with the balancing weight 21 which may be locked in any position on the arm 22 by means of the set screw 23. This scale beam is fulcrumed upon a knife edge support 24 which is secured to and projects outwardly from the side of the wagon, the said scale beam being adapted to be detachably mounted upon such fulcrum with its extreme outer end inserted through the loop 25 on the side of the wagon which limits the oscillation of the scale beam.

The V-shaped projections 26, which as has been said, depend from the bottom of the wagon bed and rest within the notches 9 of the castings 7 and 8 are made integral with the straps 27 which secure the ends of the strips 28 to the bottom of the wagon bed. These strips 28 are placed just inside the bolsters, as shown and serve, when the wagon bed is at rest upon the bolsters, to prevent longitudinal movement thereof. The projections 26 are secured to the outer ends of the strips for the reason that when the wagon bed is lifted off the bolsters in the operation of weighing, the load, being borne intermediate of said projections, will have a tendency to bow the strips and draw the sides of the wagon bed away from the standards 3 and prevent rubbing of the sides of the wagon thereagainst, which might sometimes occur, and which would prevent accurate weighing of the load. The sides of the wagon box are further drawn away from the standards by the upwardly extending portions 29 of the straps 27, which may be fastened to the wagon box while a wedge is inserted between the standards 3 and the sides of the box so that the sides of the wagon box are held from contact with the standards. Rollers 37 are also provided on the sides of the wagon box adjacent the standards, which reduce the friction of the wagon box against the standards, in case they contact in the operation of raising and weighing the load, to a minimum.

In the normal position of the wagon box on the bolsters, the levers 13 are removed from the castings 7 and the said castings occupy positions shown in dotted lines in Figs. 4 and 5, with faces thereof in contact with the side of the bolsters, as shown, in which position the rods 11 rest within the brackets 36. It will be noted that in the inoperative position of the castings, the hooked portions 6 thereof extend above the bolsters, consequently to provide a support for the wagon bed upon the bolsters, strips 30 are provided either upon the bolster as shown or upon the bottom of the wagon bed.

The strips 28 are provided at their ends with notched or cut-out portions 31 adapted to accommodate the upper portion of the castings 7 and 8 when the wagon bed is lowered and said strips are further formed with an inclined face 32 adjacent the bolster so that when in the raised position, the said strip will be free and clear of contact with the bolster. The notches 9 of the castings are constructed as shown so that in the movement of the casting the depending projections from the bottom of the wagon will ride upon the inclined face 32 of the notch as it swings inwardly and outwardly to and from the bolster.

Assuming the parts to be in the inoperative position shown in dotted lines in Figs. 4 and 5, with the wagon bed 1 resting upon the strips 30 on the bolsters,—to weigh the load the scale beam is placed in position upon the projecting fulcrum 24 on the side of the wagon, with its end within the loop 25, and the hangers or links 15 extending downwardly between the side of the wagon bed and the step 33 thereon. The levers 13 are inserted within the openings in the castings 7 and raised and hooked upon the pendent links 15. The raising of the levers, as is apparent, swings the castings 7 and 8 upon their pivotal or fulcrum mounting on the plates 4 and in their movement, the projections 26 from the bottom of the wagon ride downwardly upon the face 32 to the notch 9, and the wagon is lifted from its position of rest upon the bolsters. The scale beam being properly graduated and the adjustable block 17 previously adjusted in the proper position, the weight of the load may readily be determined. When the weight is determined, the levers 13 are disconnected from the scale beam, the wagon bed let down, the scale beam and lifting levers are removed, and may be placed in any convenient box carried upon the wagon for that purpose.

The levers are made of suitable length for an ordinary wagon, but when the distance intermediate of the bolsters is too great for the length of said levers, as it would be in the case of a hay rack, extensions 34 may be secured to the ends of the levers in any suitable manner, the slotted rod herein shown adapted to be bolted through the slot 35 thereof onto the end of the lifting lever being very satisfactory. When the levers are extended, it will be necessary to adjust the block on the scale beam further from the fulcrum to compensate for the increased length of the levers. This may be done easily by placing a known weight in the wagon bed and adjusting the block so that the scale properly registers the weight thereof.

While I have shown my invention as embodied in a certain form and have described the various parts thereof in detail, I wish to be distinctly understood that I do not limit myself to the specific construction set out.

What I claim is:

1. In a vehicle weigher, the combination with the bolsters, a load carrying frame, lifting members pivotally mounted on the top of the bolsters and levers detachably connected to said lifting members for raising and holding said load carrying frame at a balance.

2. In a vehicle weigher, the combination with a load carrying frame of lifting members, operating levers detachably connected to said lifting members, a detachable scale beam and means for connecting the aforesaid operating levers to the detachable scale beam for indicating the weight of the load.

3. In a vehicle weigher, the combination with a load carrying frame, of lifting members, levers for operating said lifting members provided with extensions, a scale beam and means for adjustably connecting the aforesaid lever extensions to the scale beam, substantially as and for the purposes specified.

4. In a vehicle weigher, the combination with a transporting truck provided with supporting bolsters, and a load carrying frame thereon, of a pair of suitably distanced correspondingly movable lifting members provided with a detachable lever for holding the load carrying frame in suspension, and a detachable scale mechanism mounted on the side of the load carrying frame connected to the detachable levers for indicating the weight of the load.

5. In a vehicle weigher, the combination with the bolsters, and load carrying frame, of bead edge plates on said bolsters, lifting members extending over the bead edge of said plates and adapted to bear on said plates in the operation of weighing the load, scale mechanism and means for connecting the aforesaid lifting members with the scale mechanism.

6. In a vehicle weigher, the combination of the bolsters, a load carrying frame with lifting bearings thereon lifting members mounted on the bolsters to swing to and from engagement with the lifting bearings on the load carrying frame, said lifting members being movable in planes at right angles to the bolsters and adapted in their inoperative positions to rest against the lateral face of the bolster whereon they are mounted.

7. In a vehicle weigher, the combination of the bolsters, a load carrying frame having knife edge bearings thereon, bearing plates on the bolsters, lifting members provided with knife edges adapted to bear on said bearing plates of the bolsters in the operation of weighing the load, and notches in said lifting members adapted to engage the knife edge bearings of the load carrying frame in the operation of weighing the load.

8. In a vehicle weigher, the combination of the bolsters, a load carrying frame, standards on the bolsters embracing the load carrying frame, bearing plates on the bolsters, lifting members having knife edge ends resting on said bearing plates and raised portions on the bolsters intermediate of the bearing plates for supporting the load carrying frame when the weighing mechanism is in the inoperative position.

9. In a vehicle weigher, the combination of the bolsters, the load carrying frame, a pair of suitably distanced lifting members pivotally mounted beneath the load carrying frame on the top of each bolster for supporting the load carrying frame in the operation of weighing the load and shafts parallel with the bolsters connecting each pair of lifting members thereon for simultaneously operating said lifting members.

10. In a vehicle weigher, the combination with the bolsters and a load carrying frame thereon, of lifting members pivotally mounted on the bolsters, levers provided with adjustable extensions for operating said lifting members, scale mechanism suitably mounted and provided with an adjustable part thereon, and means for connecting the aforesaid lever extensions with the adjustable part of the scale mechanism, substantially as and for the purposes specified.

11. In a vehicle weigher, the combination of bolsters, a load carrying frame normally supported on the said bolsters, lifting mechanism for raising the load carrying frame off the bolsters in the operation of weighing the load and strips extending across the bottom of the load carrying frame provided with beveled faces adjacent the bolsters and adapted to engage said bolsters in the normal position of the load supporting frame thereon, substantially as and for the purposes specified.

12. In a vehicle weigher, the combination of the bolsters, a load carrying frame thereon, standards on said bolsters embracing the load carrying frame, anti-friction rollers intermediate of the standards and the sides of the load carrying frame, lifting members provided with detachably operating levers for raising and holding the load carrying frame in suspension in the operation of weighing the load, scale mechanism and means for connecting said scale mechanism with the aforesaid detachable levers, substantially as and for the purposes specified.

13. In a vehicle weigher, the combination with the transporting truck provided with bolsters, of a load carrying frame thereon, a pair of suitably distanced lifting members mounted on each of said bolsters, a shaft adjacent to and parallel with the bolsters connecting the said lifting members for simultaneously operating said lifting members in the operation of lifting the load carrying frame, said lifting members being provided with openings adapted to receive the aforesaid shaft therein, and means for locking said lifting members in position on the shaft.

14. In a vehicle weigher, the combination with the transporting truck provided with bolsters, of a load carrying frame thereon, a pair of lifting members fulcrumed on each bolster, a shaft parallel with the bolster upon which they are mounted, connecting the lifting members thereon, said lifting members being provided with openings adapted to receive the shaft therein, means for locking the lifting members in place on the shaft, and bearing places on said lifting members intermediate of the fulcrum thereon and the shaft for engaging parts on the load carrying frame for raising said frame.

In testimony whereof I have affixed my signature, in presence of two witnesses.

JAMES R. HARRISON.

Witnesses:
MARY E. COMEGYS,
E. M. GILES.